United States Patent
Annapureddy et al.

(10) Patent No.: US 10,185,553 B2
(45) Date of Patent: *Jan. 22, 2019

(54) FAULT-TOLERANT VARIABLE REGION REPAVING DURING FIRMWARE OVER THE AIR UPDATE

(71) Applicant: Microsoft Technology Licensing, LLC, Redmond, WA (US)

(72) Inventors: Thirupathaiah Annapureddy, Bellevue, WA (US); Bhushan Mehendale, Bellevue, WA (US); Adam Matthew Mahood, Seattle, WA (US); Ajit Justin, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 55 days.

This patent is subject to a terminal disclaimer.

(21) Appl. No.: 15/370,405

(22) Filed: Dec. 6, 2016

(65) Prior Publication Data

US 2018/0004506 A1 Jan. 4, 2018

Related U.S. Application Data

(60) Provisional application No. 62/357,021, filed on Jun. 30, 2016.

(51) Int. Cl.
*G06F 8/00* (2018.01)
*G06F 8/654* (2018.01)
(Continued)

(52) U.S. Cl.
CPC .......... *G06F 8/654* (2018.02); *G06F 11/1433* (2013.01); *H04L 67/34* (2013.01)

(58) Field of Classification Search
CPC ....................................................... G06F 8/654
See application file for complete search history.

(56) References Cited

U.S. PATENT DOCUMENTS 7,480,907 B1 1/2009 Marolia et al.
7,805,719 B2 9/2010 O'Neill
(Continued)

FOREIGN PATENT DOCUMENTS

WO 2014117328 A1 8/2014
WO 2014175864 A1 10/2014

OTHER PUBLICATIONS

"International Search Report and Written Opinion Issued in PCT Application No. PCT/US2017/038893", dated Sep. 29, 2017, 10 Pages.

(Continued)

*Primary Examiner* — Bryce P Bonzo
*Assistant Examiner* — Katherine Lin
(74) *Attorney, Agent, or Firm* — Mark K. Young; Mayer & Williams PC

(57) ABSTRACT

Variables utilized in device firmware that provides various boot and runtime services are repaved in a fault-tolerant manner within a secure store in a durable, non-volatile device memory during an FOTA update process. A spare region in the secure store is utilized to temporarily hold a back-up of a primary region in which the firmware variables are written. Using a transaction-based fault-tolerant write (FTW) process, the variables in the primary region can be repaved with variables contained in a firmware update payload that is delivered from a remote service. In the event of a fault in the variable region repaving process, either the primary or spare region will remain valid so that firmware in a known good state can be utilized to enable the device to (Continued)

boot successfully and the variable region repaving in the FOTA update process may be restarted.

20 Claims, 15 Drawing Sheets

(51) Int. Cl.
*H04L 29/08* (2006.01)
*G06F 11/14* (2006.01)

(56) References Cited

U.S. PATENT DOCUMENTS

| | | | |
|---|---|---|---|
| 8,107,945 B2 | 1/2012 | Hoffner et al. | |
| 8,589,910 B2 | 11/2013 | Zubas et al. | |
| 8,726,259 B2 | 5/2014 | Juneja | |
| 8,869,138 B2 | 10/2014 | Bandakka et al. | |
| 2004/0054995 A1 | 3/2004 | Lee | |
| 2005/0144612 A1 | 6/2005 | Wang et al. | |
| 2009/0006834 A1* | 1/2009 | Rothman | G06F 8/65 713/2 |
| 2009/0320012 A1* | 12/2009 | Lee | G06F 8/65 717/168 |
| 2010/0325622 A1 | 12/2010 | Morton | |
| 2012/0144279 A1 | 6/2012 | Rabeler | |
| 2013/0185548 A1 | 7/2013 | Djabarov et al. | |
| 2013/0185563 A1 | 7/2013 | Djabarov et al. | |
| 2013/0332647 A1 | 12/2013 | Rabeler et al. | |
| 2014/0351571 A1 | 11/2014 | Jacobs | |
| 2015/0065117 A1* | 3/2015 | Polson | H04W 8/245 455/419 |
| 2015/0089209 A1 | 3/2015 | Jacobs et al. | |
| 2015/0370302 A1 | 12/2015 | Mudusuru et al. | |
| 2016/0179500 A1 | 6/2016 | Hsieh et al. | |
| 2017/0255459 A1* | 9/2017 | Tanimoto | G06F 8/65 |
| 2018/0004505 A1 | 1/2018 | Annapureddy et al. | |

OTHER PUBLICATIONS

Nilsson, et al., "A Framework for Self-Verification of Firmware Updates over the Air in Vehicle ECUs", In Proceedings of IEEE Globecom Workshops, Nov. 30, 2008, pp. 1-5. (5 pages total).

"International Search Report and Written Opinion Issued in PCT Application No. PCT/US2017/038890", dated Jul. 10, 2018, 17 Pages.

"Non Final Office Action Issued in U.S. Appl. No. 15/370,295", dated May 4, 2018, 6 Pages.

"Invitation to Pay Additional Fee Issued in PCT Application No. PCT/US2017/038890", dated Dec. 22, 2017, 11 Pages.

* cited by examiner

FAULT-TOLERANT VARIABLE REGION REPAVING DURING FIRMWARE OVER THE AIR UPDATE

CROSS REFERENCE TO RELATED APPLICATION

This application claims benefit and priority to U.S. Provisional Application Ser. No. 62/357,021 filed Jun. 30, 2016, entitled "Fault Tolerant Variable Region Repaving During Firmware Over the Air Update" which is incorporated herein by reference in its entirety.

BACKGROUND

Over the air (OTA) programming can be used to distribute computer-executable instructions, software, updates, and other code to devices such as smartphones, wearable computing devices, set-top boxes, personal computers, and other computing platforms over a network connection. Similarly, device firmware updates can be distributed to devices using a firmware over the air (FOTA) process.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Variables utilized in device firmware that provides various boot and runtime services are repaved in a fault-tolerant manner within a secure store in a durable, non-volatile device memory during an FOTA update process. A spare region in the secure store is utilized to temporarily hold a back-up of a primary region in which the firmware variables are written. Using a transaction-based fault-tolerant write (FTW) process, the variables in the primary region can be repaved with variables contained in a firmware update payload that is delivered from a remote service. In the event of a fault in the variable region repaving process, either the primary or spare region will remain valid so that firmware in a known good state can be utilized to enable the device to boot successfully and the variable region repaving in the FOTA update process may be restarted.

In various illustrative examples, a Unified Extensible Firmware Interface (UEFI) that conforms to a specification maintained by the Unified EFI Forum provides an interface between device firmware and the device's operating system (OS). In addition to its conventional role of providing an initial system configuration for the device and loading the OS, the UEFI is extended to enable modifications to a secure store so that UEFI variables can be repaved in a fault-tolerant process during an FOTA update. The UEFI variables store various kinds of information including configuration setup, vendor/OEM (original equipment manufacturer) data, language information, input/output and error handling interfaces, and boot order, among other information. A device may be optionally configured with one or more switches that can be set to selectively enable or disable the fault-tolerant variable region repaving. In addition, a firmware update payload can include a whitelist of UEFI variables that can be preserved during repaving. A cryptographic process may also be utilized in which the incoming firmware update payload is validated prior to UEFI variable region repaving.

Advantageously, the fault-tolerant UEFI variable region repaving during an FOTA update process addresses limitations of current firmware update processes in which re-provisioning of the non-volatile UEFI variable store is not supported. By extending UEFI to enable the variables to be repaved in the non-volatile store in a fault-tolerant manner, firmware updates can be efficiently and effectively provisioned over the air while ensuring that a known good boot state is always available. Such capability provides additional flexibility in keeping devices up to date after leaving the factory environment and being deployed in the field.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
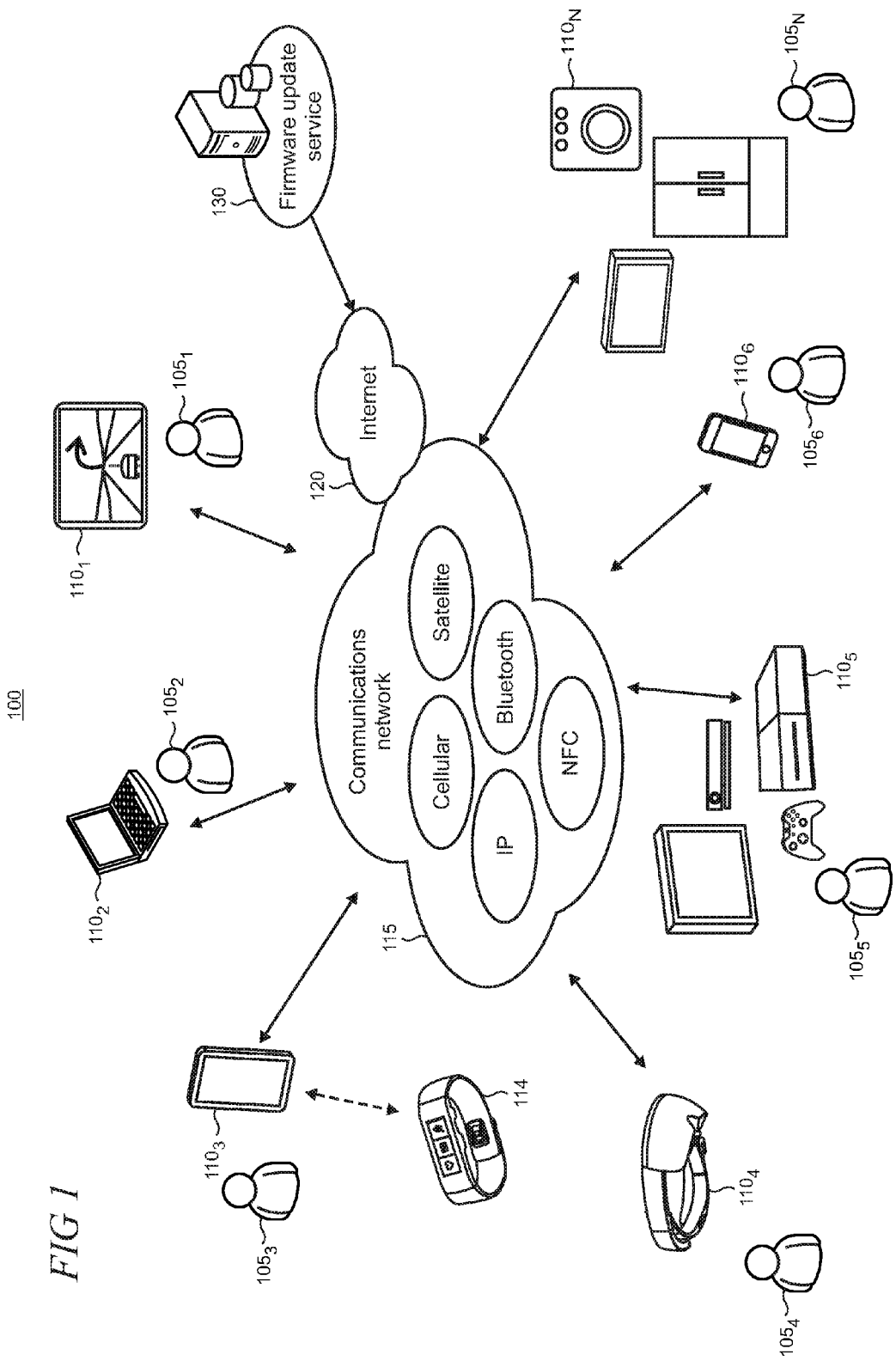
FIG. 1 shows an illustrative computing environment in which devices can communicate and interact over a network with a remote firmware update service during a firmware over the air (FOTA) update process.

FIG. 1 shows an illustrative environment 100 in which the same or different users 105 may employ various devices 110 that are configured to communicate over a network 115 with a remote firmware update service 130. The network 115 may include portions of the Internet 120 or may include interfaces that support a connection to the Internet so that the devices 110 can access content and render user experiences provided by various remote or cloud-based application services (not shown). The application services can respectively support a diversity of applications such as social networking, mapping, news and information, entertainment, travel, productivity, finance, etc.

The network 115 can include any of a variety of network types and network infrastructure in various combinations or sub-combinations including cellular networks, satellite networks, IP (Internet-Protocol) networks such as Wi-Fi under IEEE 802.11 and Ethernet networks under IEEE 802.3, a public switched telephone network (PSTN), short range networks such as Bluetooth® networks, and/or near field communications (NFC) networks. The network infrastructure can be supported, for example, by mobile operators, enterprises, Internet service providers (ISPs), telephone service providers, data service providers, and the like.

The devices 110 can support voice telephony capabilities in some cases and typically support data-consuming applications such as Internet browsing and multimedia (e.g., music, video, etc.) consumption in addition to various other features. The devices 110 may include, for example, user equipment, mobile phones, cell phones, feature phones, tablet computers, and smartphones which users often employ to make and receive voice and/or multimedia (i.e., video) calls, engage in messaging (e.g., texting) and email communications, use applications and access services that employ data, browse the World Wide Web, and the like.

Other types of electronic devices are also envisioned to be usable within the environment 100 including handheld computing devices, PDAs (personal digital assistants), portable media players, devices that use headsets and earphones (e.g., Bluetooth-compatible devices), phablet devices (i.e., combination smartphone/tablet devices), wearable computing devices such as head-mounted display (HMD) systems and smartwatches, embedded systems such as navigation devices like GPS (Global Positioning System) systems, laptop PCs, desktop PCs, multimedia consoles, gaming systems, smart appliances and televisions, the Internet-of-Things (TOT) devices, or the like. In the discussion that follows, the use of the term "device" is intended to cover all devices that are configured with communication capabilities and are capable of connectivity to the communications network 115.

The various devices 110 in the environment 100 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited user interface. Some devices may support video consumption and Internet browsing, while other devices may support more limited media handling and network interface features.

Accessory devices 114, such as wristbands and other wearable systems may also be present in the environment 100. Such accessory device 114 typically is adapted to interoperate with a coupled device 110 using a short range communication protocol like Bluetooth to support functions such as monitoring of the wearer's physiology (e.g., heart rate, steps taken, calories burned, etc.) and environmental conditions (temperature, humidity, ultra-violet (UV) levels, etc.), and surfacing notifications from the coupled device 110. Some accessory devices can be configured to work on a standalone basis (i.e., without relying on a coupled device 110 for functionality such as Internet connectivity) as wearable computing devices that may support an operating system and applications.

Figure 2:
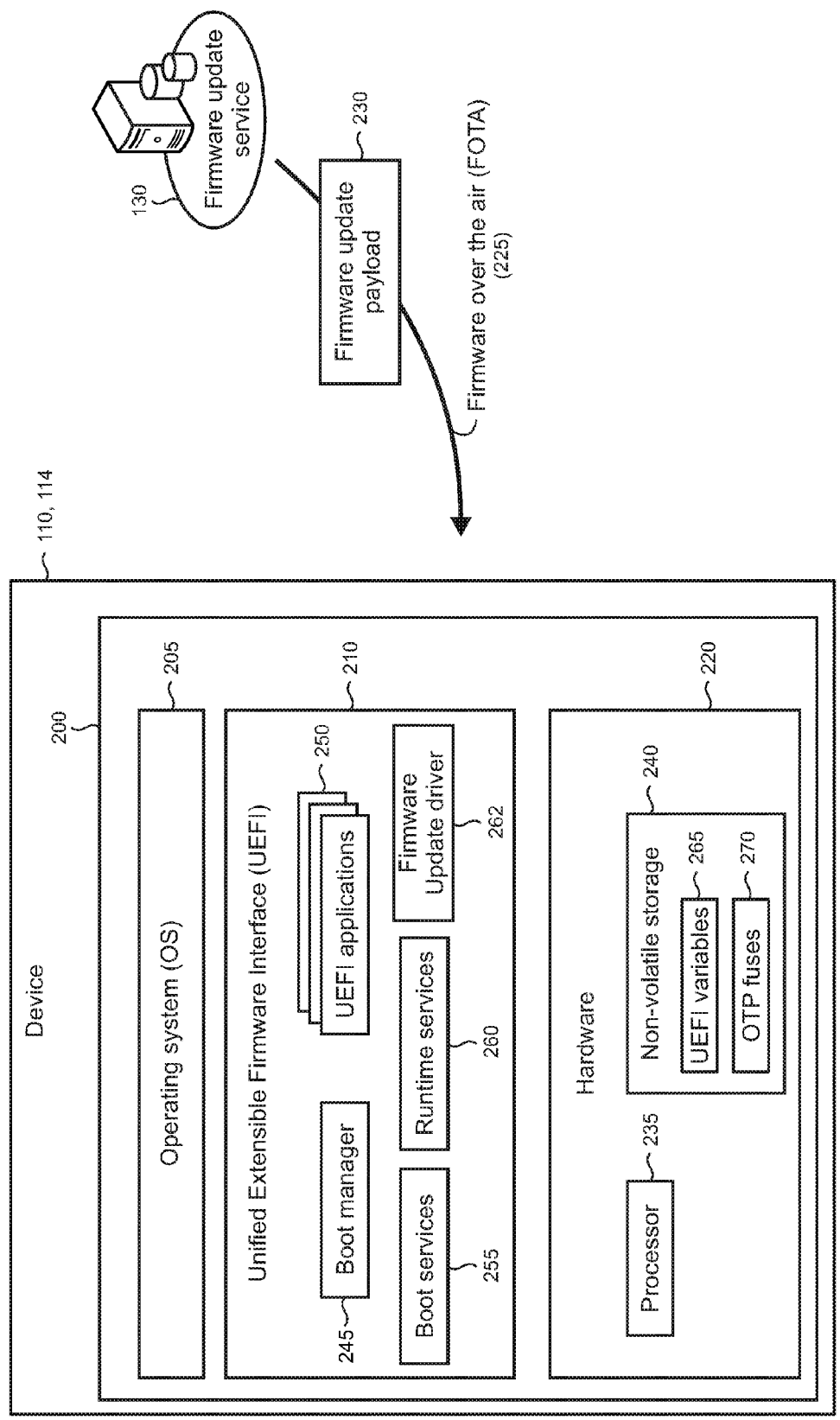
FIG. 2 shows an illustrative layered architecture on a device that includes a hardware layer, a Unified Extensible Firmware Interface (UEFI) layer, and an operating system (OS) layer.

FIG. 2 shows an illustrative architecture 200 that may be utilized on a given device (e.g., device 110 or 114 in FIG. 1). The architecture 200 is arranged in layers and includes an operating system (OS) 205, a firmware interface 210, and hardware 220. The hardware 220 typically includes at least a processor 235 and non-volatile (i.e., durable) storage 240.

In this particular example, the firmware interface 210 is implemented with UEFI and is configured to be compliant with the specifications published by the Unified EFI Forum. An FOTA delivery process (as indicated by reference numeral 225) provides a firmware update payload 230 from the remote firmware update service 130 over a network (not shown), typically in accordance with the Update Capsule runtime function defined in the UEFI specification. In alternative implementations, other firmware interfaces that meet other standards or protocols may also be extended to support fault-tolerant variable region repaving during FOTA updates, as described herein. The UEFI 210 provides a general framework with which a boot manager 245 and UEFI applications 250 can provide various boot services 255 and runtime services 260. UEFI has succeeded BIOS (basic input/output system) as the standard firmware on many computing platforms that is configured to initialize the hardware 220 and then boot the device into the main OS 205.

A firmware update driver 262 is utilized to modify firmware by repaving the UEFI variables, as discussed below. The driver 262 may be implemented as a UEFI DXE (Driver Execution Environment) driver. In alternative implementations, the functionality provided by the driver 262 can be incorporated into the boot manager 245 or UEFI applications 250 instead of being instantiated as a separate component in the UEFI 210.

The boot services 255 can include procedures to enable UEFI Secure Boot using the firmware that adds security to the boot process. Systems which support UEFI Secure Boot maintain an internal security database within UEFI variables 265. These UEFI variables 265 are typically stored in non-volatile storage 240 that is configured with hardware protection against modification by unauthorized parties. The non-volatile storage 240 also includes one-time programmable (OTP) fuses 270 which are used to store a hash of a public-key used for cryptographic validation, as discussed below in the text accompanying FIG. 8. As noted above, the UEFI variables may store various kinds of information including configuration setup, vendor/OEM data, language information, input/output and error handling interfaces, and boot order, among other information. In addition, the UEFI variables may control security checking of UEFI 210 and there are several variables that define boot targets including a boot-loader for the OS 205.

Figure 3:
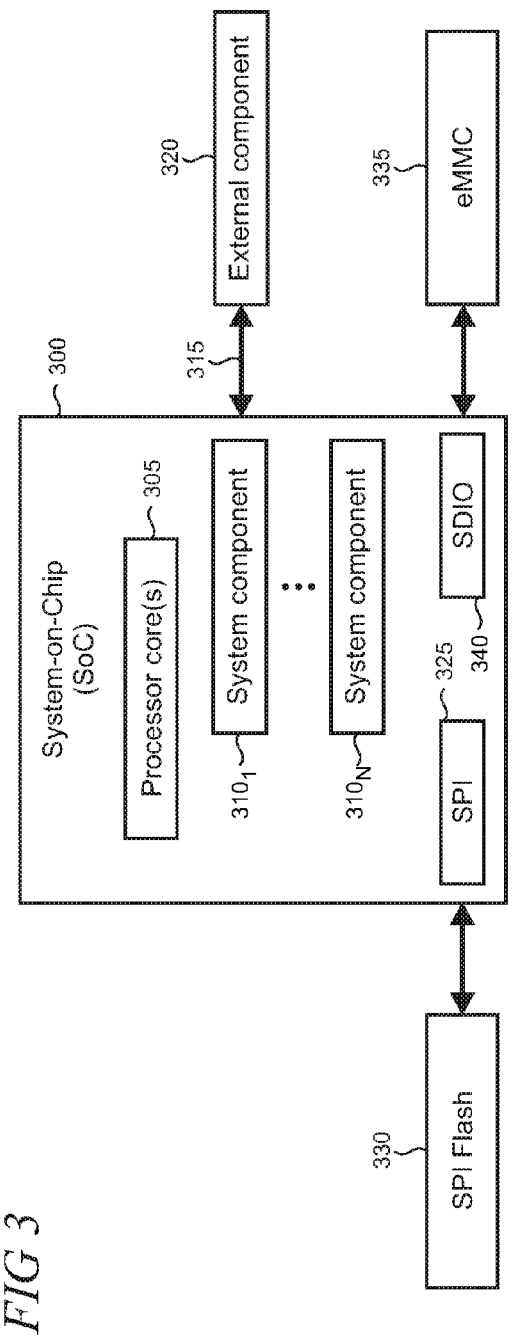
FIG. 3 shows an illustrative system on chip (SoC) arrangement.

FIG. 3 shows illustrative hardware with which the architecture 200 (FIG. 2) may be implemented. In this example, a system-on-chip (SoC) 300 integrates one or more processor cores 305 and a complete set of system components 310 on a single chip. The system components 310 utilize various interconnects and buses to external components as representatively indicated by reference numerals 315 and 320. Thus, the SoC 300 can support systems such as graphics and displays, video codecs, audio, memory controller, ports, general purpose input/output (GPIO), and the like. One exemplary system component is an SPI (serial peripheral interface) bus component 325 that interfaces with non-volatile SPI Flash memory 330 (e.g., serial NOR flash, or SPI-NOR Flash). Other types of non-volatile memory and embedded storage can also be utilized by the SoC 300 such as eMMC (embedded MultiMedia Card) 335 or NAND Flash (not shown in FIG. 3) using an SDIO (secure digital input output) bus component 340. Such memories provide secure stores that provide hardware protection against modification by unauthorized parties, for example, using secure partitions under RPMB (replay protected memory block) for eMMC memory, and RPMC (replay protected monotonic counter) for SPI Flash memory.

Figure 4:
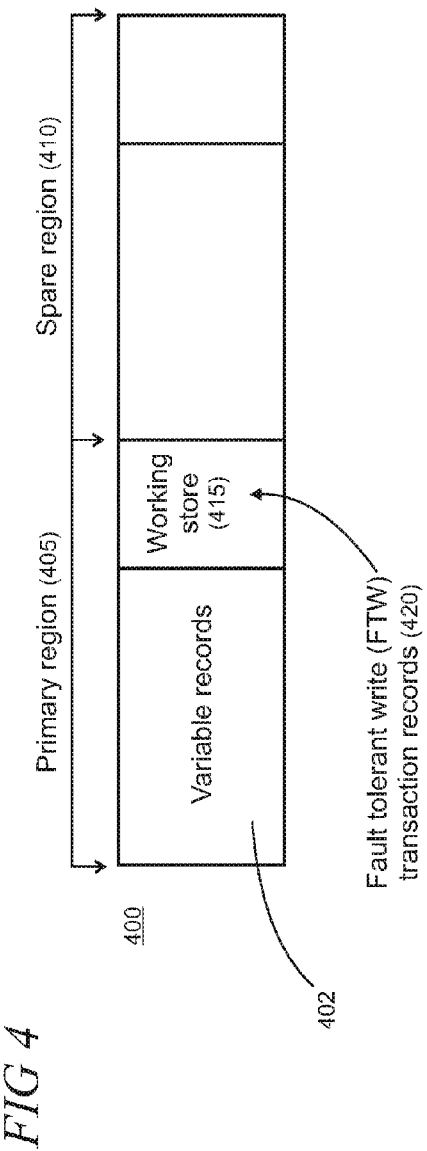
FIG. 4 shows illustrative primary and spare regions of a secure store that is implemented in non-volatile memory.

The secure non-volatile memory 400 (e.g., SPI Flash, eMMC) is represented in FIG. 4 which shows the memory distributed into a primary region 405 and a spare region 410. The primary region 405 securely stores records 402 associated with the UEFI variables. The primary region includes a working store 415 that holds transaction records 420 associated with the FTW protocol as described by EDK II (EFI development kit version II) maintained by TianoCore.org. The working store is typically implemented as the last block in the primary region 405, as shown, although the working store may be implemented using multiple blocks in some implementations. The firmware update driver 262 (FIG. 2) has access to the Tiano Core FTW stack to enable fault-tolerant updates of records in the primary region 405 in which selected UEFI variables are repaved using data contained in the firmware update payload 230 (FIG. 2). The spare region 410 is sized to enable a back-up to be performed by the primary region 405. Thus, if the primary region is 128 Kb, then the spare region is also sized to be 128 Kb in typical implementations. The spare region 410 is temporarily utilized during the variable region repaving process.

Figure 5:
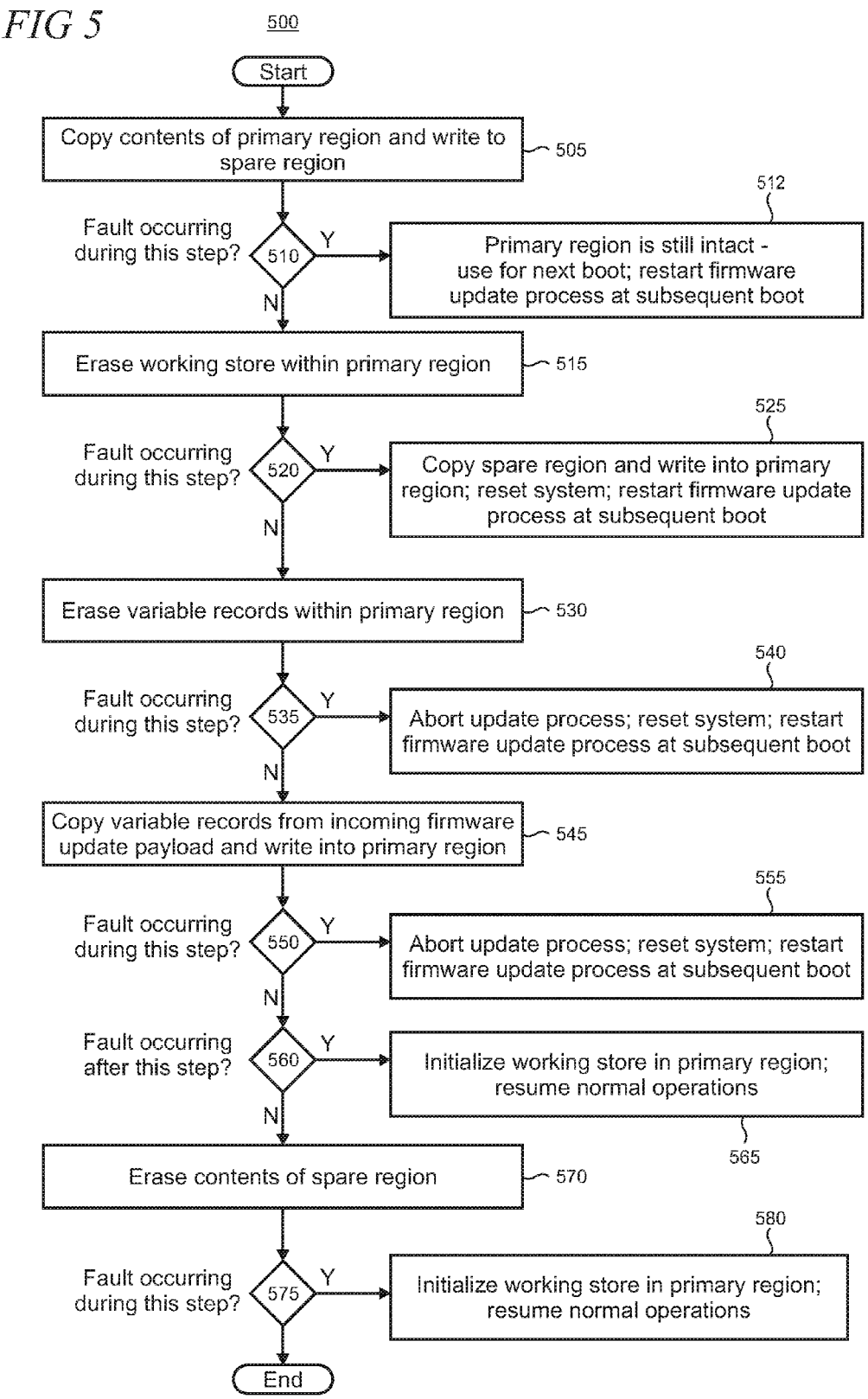
FIG. 5 shows an illustrative fault-tolerant UEFI variable region repaving method that is performed in an FOTA update process.

FIG. 5 shows an illustrative fault-tolerant UEFI variable region repaving method 500 that is performed in an FOTA update process with reference to the diagram of the memory 400 shown in FIG. 4. The term "repaving" as used herein means some or all of the UEFI variables in the primary region are replaced by corresponding variables from the firmware update payload 230 (FIG. 2). In typical implementations, the UEFI variable region repaving may be the last step in the FOTA update as that increases the likelihood that free space in the memory 400 is available to back up the UEFI variables, as described in more detail below. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized. In step 505, the contents of the primary region 405 are copied and written to the spare region 410 using the FTW protocol described above (the spare region is typically erased prior to step 505 being performed). At decision block 510, if a fault occurs during step 505, the primary region 405 is still intact and the variables stored therein can be used at subsequent boot of the device and the variable region repaving in the FOTA update process can be restarted, as shown in step 512.

In step 515, if step 505 is successful, then the working store 415 in the primary region 405 is erased. If step 505 is successful, then a valid copy of the variables and working store are contained in both the primary region 405 and spare region 410. At decision block 520, if a fault during or after step 515 is detected (e.g., by the driver being able to clean the first bit of the working region), then in step 525, the intact spare region 410 is copied back into the primary region 405, the system is reset, and the variable region repaving in the FOTA update process can be restarted in a subsequent boot.

In step 530, the variable records in the primary region 405 are erased. If step 530 is successful, then a valid copy of the variables and working store are contained in the spare region 410. At decision block 535, if a fault occurs during step 530, then in step 540, the FOTA update process is gracefully aborted, the intact spare region 410 is copied back into the primary region 405, the system is reset, and the variable region repaving in the FOTA update process can be restarted in a subsequent boot.

In step 545, the variable records are copied from the incoming firmware update payload 230 (FIG. 2) and written into the primary region 405 using the FTW protocol. If step 545 completes successfully, then a valid copy of the variables is contained in both the primary and spare regions, but the primary region is repaved with the latest variables from the payload 230. The working store in the spare region 410 (i.e., the last block of the spare region) contains valid content while the working store in the primary region 405 is empty and uninitialized. At decision block 550, if a fault occurs during step 545, then in step 555 the FOTA update process is gracefully aborted, the intact spare region 410 is copied back into the primary region 405, the system is reset, and the variable region repaving in the FOTA update process can be restarted in a subsequent boot. At decision block 560, if a fault occurs after step 545, then in step 565 the working store 415 in the primary region 405 may be gracefully initialized and normal device operation can resume.

In step 570, the spare region 410 is erased. If step 570 is completed successfully, then the FOTA update process is complete since the repaving of the variables in the primary region with updated information from the firmware update payload is typically the last step of the FOTA update process, as noted above. At decision block 575, if a fault occurs in step 570, then in step 580 the working store 415 in the primary region 405 may be gracefully initialized and normal device operation can resume.

Figure 6:
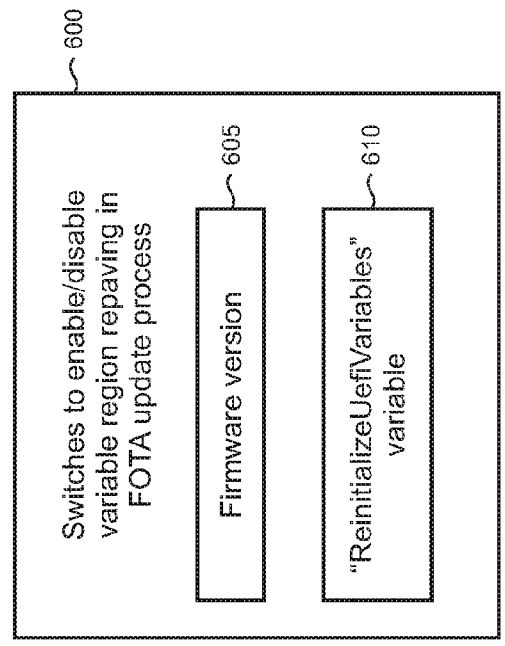
FIG. 6 shows illustrative switches for enabling/disabling the UEFI variable region repaving in an FOTA update process.

Various options that may be implemented for fault-tolerant variable region repaving as part of an FOTA update process are now presented. FIG. 6 shows illustrative switches 600 for enabling/disabling the process. The switches allow devices to skip variable region repaving which can be advantageous in some cases, particularly when device resources and/or network bandwidth are more limited. For example, some firmware updates may be intended to address specific functional issues on a device and/or may not include security fixes. Accordingly, such updates may not need to repave the variable records in the primary region and the time and complexity of a firmware update may be reduced in some cases.

The switches 600 include a firmware version 605 and a reinitialize variable 610 named "ReinitializeUefiVariables" in this example. The firmware version 605 stores a version number, for example the BIOS security version number (SVN) called "Critical_SVN" in this example. The version of the existing firmware on the device may be compared to the version of the firmware in the incoming firmware update payload. If the device firmware has an SVN that is older than that of the update, then the variable region can be repaved using the method 500 shown in FIG. 5 and described in the accompanying text. Otherwise, the update can be skipped. Similarly, the reinitialize variable 610 can be set to an "on" state so that the fault-tolerant variable region repaving in an FOTA update process can proceed at the next available update. If the variable 610 is set to an "off" state, then the update can be skipped.

Figure 7:
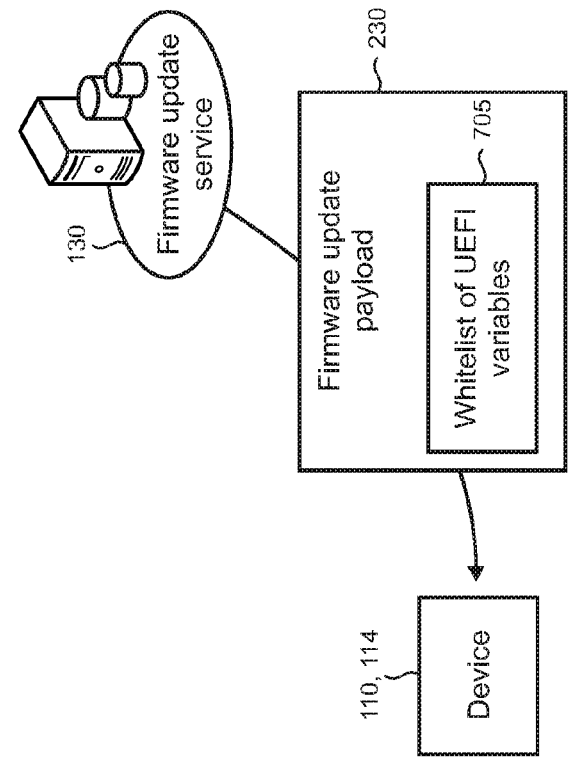
FIG. 7 shows an illustrative whitelist of UEFI variables that may be included in a firmware update payload.

FIG. 7 shows an illustrative whitelist 705 of UEFI variables that may be included in a firmware update payload 230. The whitelist 705 enables developers, OEMs, and device manufacturers, for example, to preserve certain key UEFI variables across firmware updates. For example, the whitelist of UEFI variables can be utilized to enable device state to be persisted after a firmware update. For example, some device features can remain locked or unlocked, dual boot capabilities may be enabled, and the like.

Figure 8:
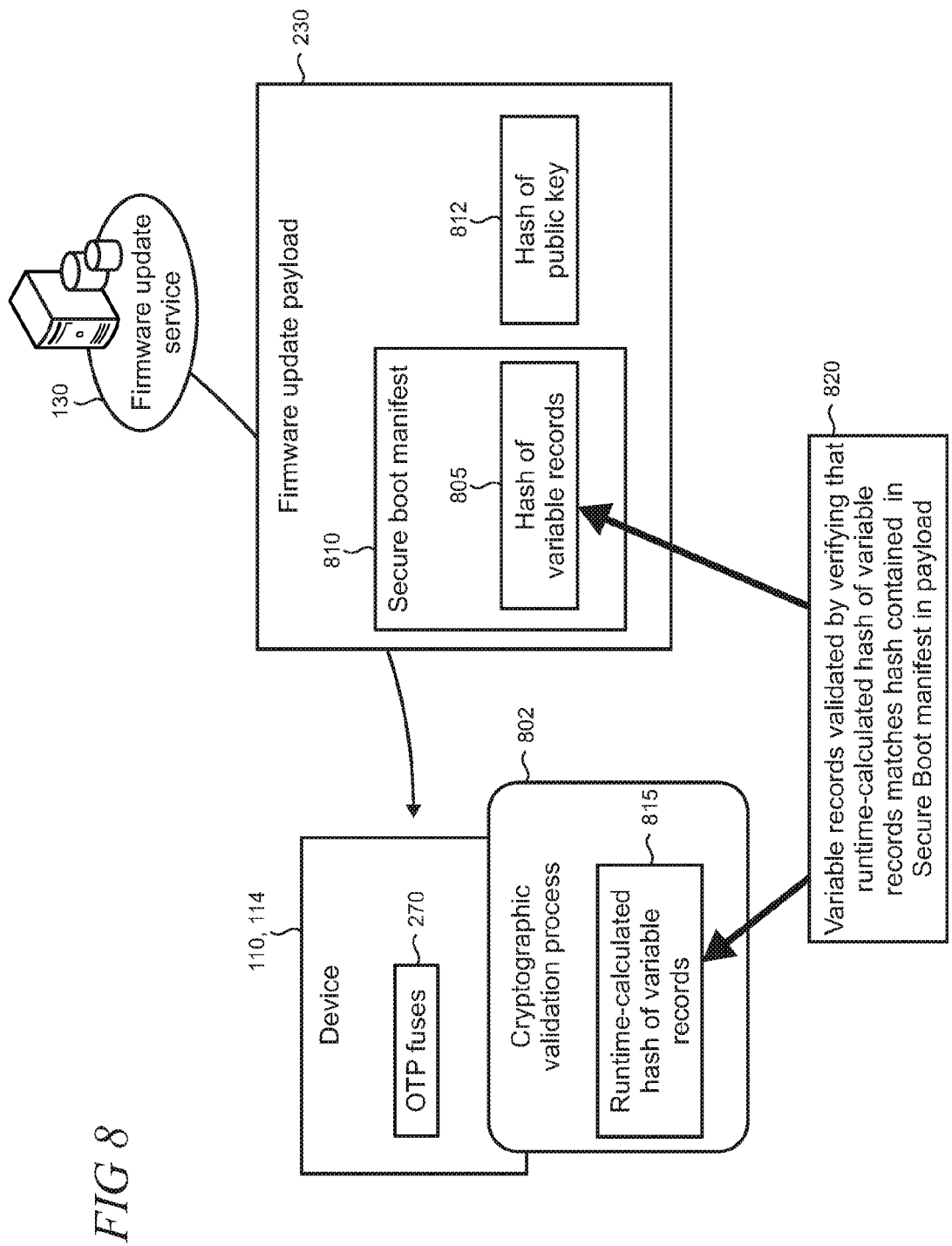
FIG. 8 shows an illustrative cryptographic process that is exposed on a device to validate UEFI variable records in a firmware update payload prior to UEFI variable region repaving.

FIG. 8 shows an illustrative cryptographic process 802 that is exposed on a device (e.g., device 110, 114 in FIG. 1) to validate UEFI variable records in a firmware update payload 230 prior to UEFI variable region repaving, as described above in the text accompanying FIG. 5. This means that only trusted firmware will be run during a boot process. As shown, a hash 805 of the variable records in the firmware update payload is included in a secure boot manifest 810 in the firmware update payload 230. The secure boot manifest 810 itself is trusted by verifying that a hash of the public key 812 used for authentication matches that stored on the OTP fuses 270. The process 802 validates the variable records by verifying that a runtime-calculated hash 815 of the variable records matches the hash contained in the secure boot manifest 810, as indicated by reference numeral 820. Thus, the cryptographic validation process provides that the integrity of the variable records is ensured so that only valid variable records are used to repave the UEFI variables in the primary region of the memory.

Figure 9:
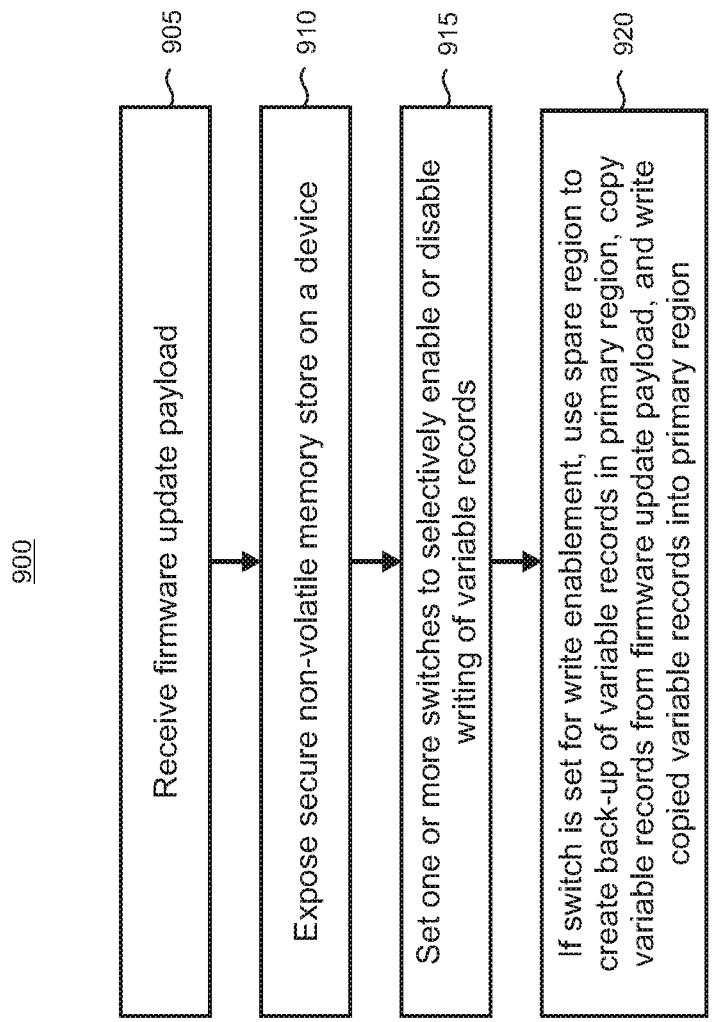
FIGS. 9, 10, and 11 show illustrative variable region repaving methods during an FOTA update.
Figure 10:
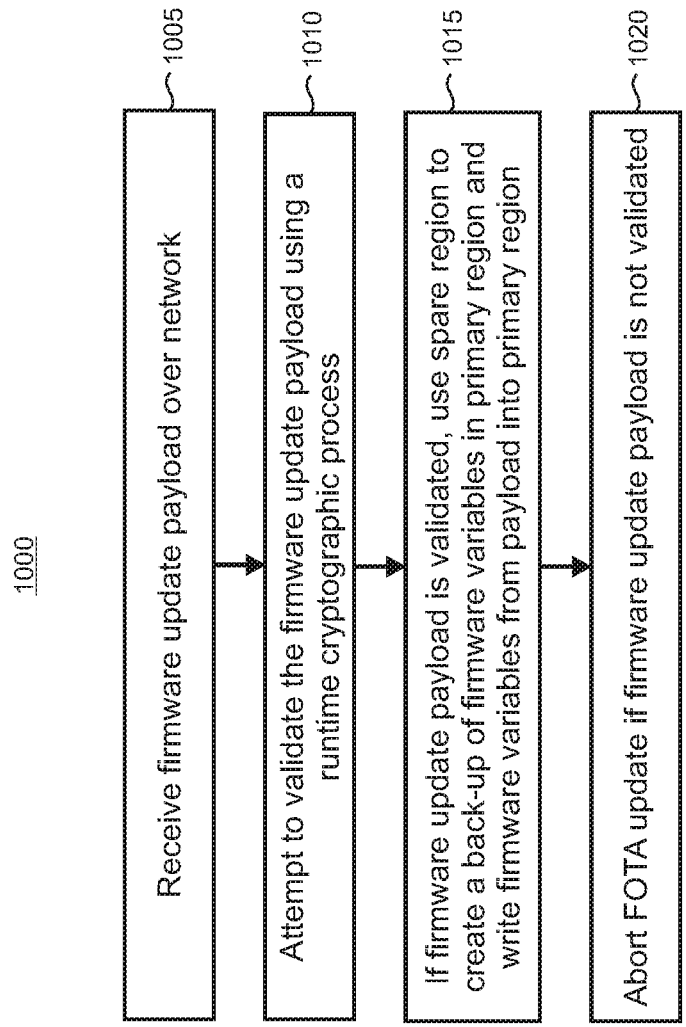
Figure 11:
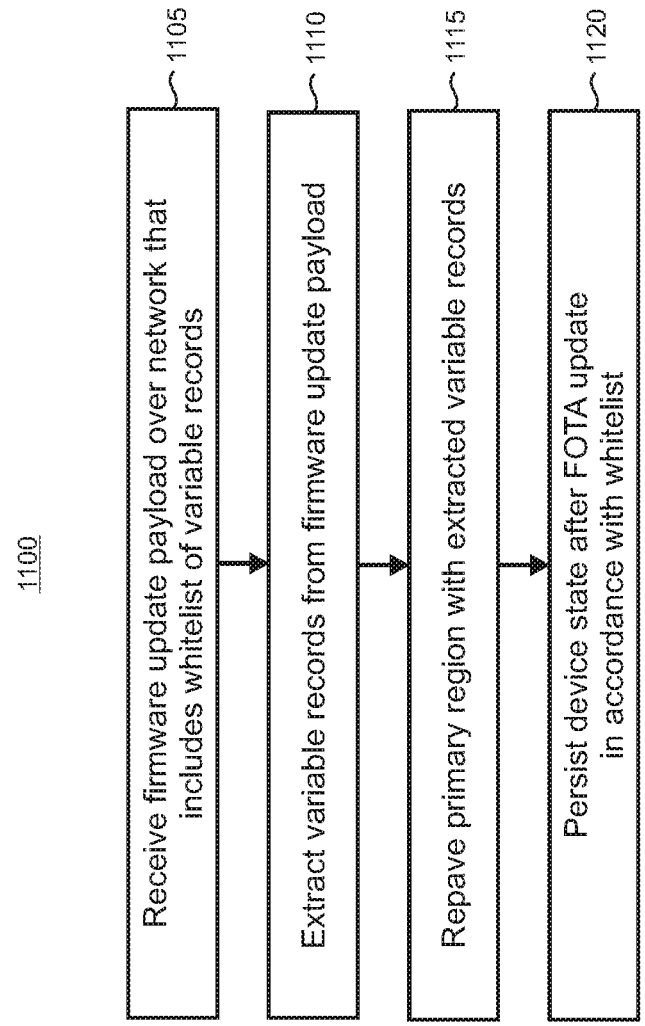

FIGS. 9, 10, and 11 show illustrative variable region repaving methods during an FOTA update. FIG. 9 shows a method 900 for updating firmware that may be implemented by a device (e.g., device 110 or 114 in FIG. 1). In step 905, a firmware update payload is received at the device. In step 910, a secure non-volatile memory store is exposed on the device. The memory includes a primary region and a spare region, each with a working store for transaction records. In step 915, one or more switches are set to selectively enable or disable writing of variable records into the primary region. In step 920, if a switch is set for write enablement, then the spare region is used to create a back-up of variable records in the primary region, variable records in the firmware update payload are copied, and written into the primary region.

FIG. 10 shows a method 1000 that may be implemented by a device (e.g., device 110 or 114 in FIG. 1) as part of an FOTA update. In step 1005, a firmware update payload is received over a network connection. In step 1010, an attempt is made to validate the firmware update payload using a runtime cryptographic process. In step 1015, if the firmware update is validated, a spare region is used to create a back-up of firmware variables in the primary region, and the firmware variables from the payload are written into the primary region. In step 1020, if the firmware update is not validated, then the FOTA update is aborted.

FIG. 11 shows a method 1100 that may be implemented by a device (e.g., device 110 or 114 in FIG. 1) as part of an FOTA update. In step 1105, a firmware update payload is received over a network connection and includes a whitelist of variables records that may be used to persist device state across firmware updates. The whitelist may be included as part of the secure update capsule in the firmware update payload and thus be subject to the same cryptographic validation as described above to ensure that the integrity of the whitelist is not compromised. In step 1110, variable records are extracted from the firmware update payload and used to repave the primary region in step 1115. In step 1120, device state is persisted in accordance with the whitelist after the FOTA update is completed.

Figure 12:
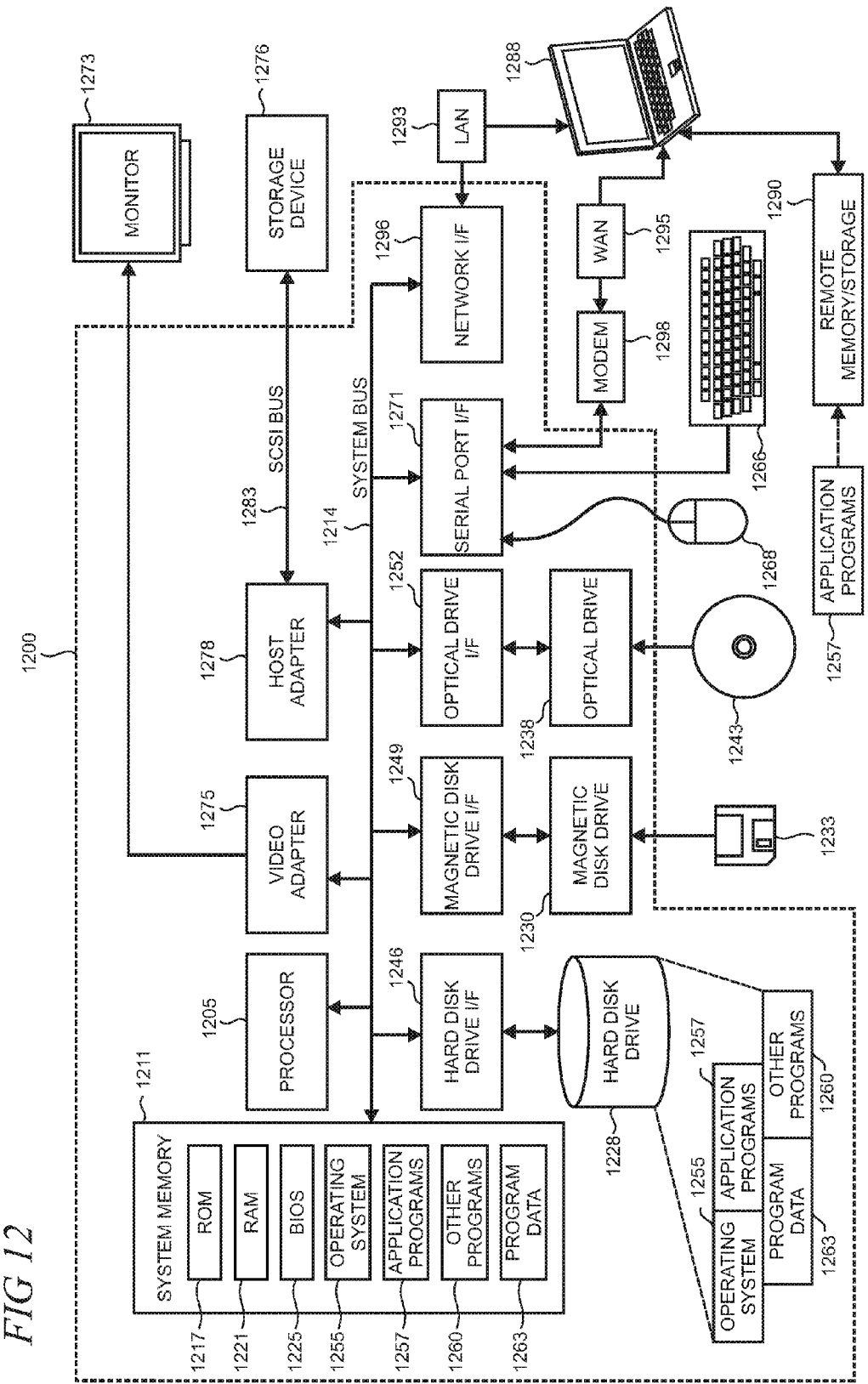
FIG. 12 is a simplified block diagram of an illustrative computer system such as a personal computer (PC) that may be used in part to implement the present fault-tolerant variable region repaving during an FOTA update.

FIG. 12 is a simplified block diagram of an illustrative computer system 1200 such as a PC, client machine, or server with which the present fault-tolerant variable region repaving during an FOTA update may be implemented. Computer system 1200 includes a processor 1205, a system memory 1211, and a system bus 1214 that couples various system components including the system memory 1211 to the processor 1205. The system bus 1214 may be any of several types of bus structures including a memory bus or memory controller, a peripheral bus, or a local bus using any of a variety of bus architectures. The system memory 1211 includes read only memory (ROM) 1217 and random access memory (RAM) 1221. A basic input/output system (BIOS) 1225, containing the basic routines that help to transfer information between elements within the computer system 1200, such as during startup, is stored in ROM 1217. The computer system 1200 may further include a hard disk drive 1228 for reading from and writing to an internally disposed hard disk (not shown), a magnetic disk drive 1230 for reading from or writing to a removable magnetic disk 1233 (e.g., a floppy disk), and an optical disk drive 1238 for reading from or writing to a removable optical disk 1243 such as a CD (compact disc), DVD (digital versatile disc), or other optical media. The hard disk drive 1228, magnetic disk drive 1230, and optical disk drive 1238 are connected to the system bus 1214 by a hard disk drive interface 1246, a magnetic disk drive interface 1249, and an optical drive interface 1252, respectively. The drives and their associated computer-readable storage media provide non-volatile storage of computer-readable instructions, data structures, program modules, and other data for the computer system 1200. Although this illustrative example includes a hard disk, a removable magnetic disk 1233, and a removable optical disk 1243, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present fault-tolerant variable region repaving during an FOTA update. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 1233, optical disk 1243, ROM 1217, or RAM 1221, including an operating system 1255, one or more application programs 1257, other program modules 1260, and program data 1263. A user may enter commands and information into the computer system 1200 through input devices such as a keyboard 1266 and pointing device 1268 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1205 through a serial port interface 1271 that is coupled to the system bus 1214, but may be connected by other interfaces, such as a parallel port, game port, or universal serial bus (USB). A monitor 1273 or other type of display device is also connected to the system bus 1214 via an interface, such as a video adapter 1275. In addition to the monitor 1273, personal computers typically include other peripheral output devices (not shown), such as speakers and printers. The illustrative example shown in FIG. 12 also includes a host adapter 1278, a Small Computer System Interface (SCSI) bus 1283, and an external storage device 1276 connected to the SCSI bus 1283.

The computer system 1200 is operable in a networked environment using logical connections to one or more remote computers, such as a remote computer 1288. The remote computer 1288 may be selected as another personal computer, a server, a router, a network PC, a peer device, or other common network node, and typically includes many or all of the elements described above relative to the computer system 1200, although only a single representative remote memory/storage device 1290 is shown in FIG. 12. The logical connections depicted in FIG. 12 include a local area network (LAN) 1293 and a wide area network (WAN) 1295. Such networking environments are often deployed, for example, in offices, enterprise-wide computer networks, intranets, and the Internet.

When used in a LAN networking environment, the computer system 1200 is connected to the local area network 1293 through a network interface or adapter 1296. When used in a WAN networking environment, the computer system 1200 typically includes a broadband modem 1298, network gateway, or other means for establishing communications over the wide area network 1295, such as the Internet. The broadband modem 1298, which may be internal or external, is connected to the system bus 1214 via a serial port interface 1271. In a networked environment, program modules related to the computer system 1200, or portions thereof, may be stored in the remote memory storage device 1290. It is noted that the network connections shown in FIG. 12 are illustrative and other means of establishing a communications link between the computers may be used depending on the specific requirements of an application of the present fault-tolerant variable region repaving during an FOTA update.

Figure 13:
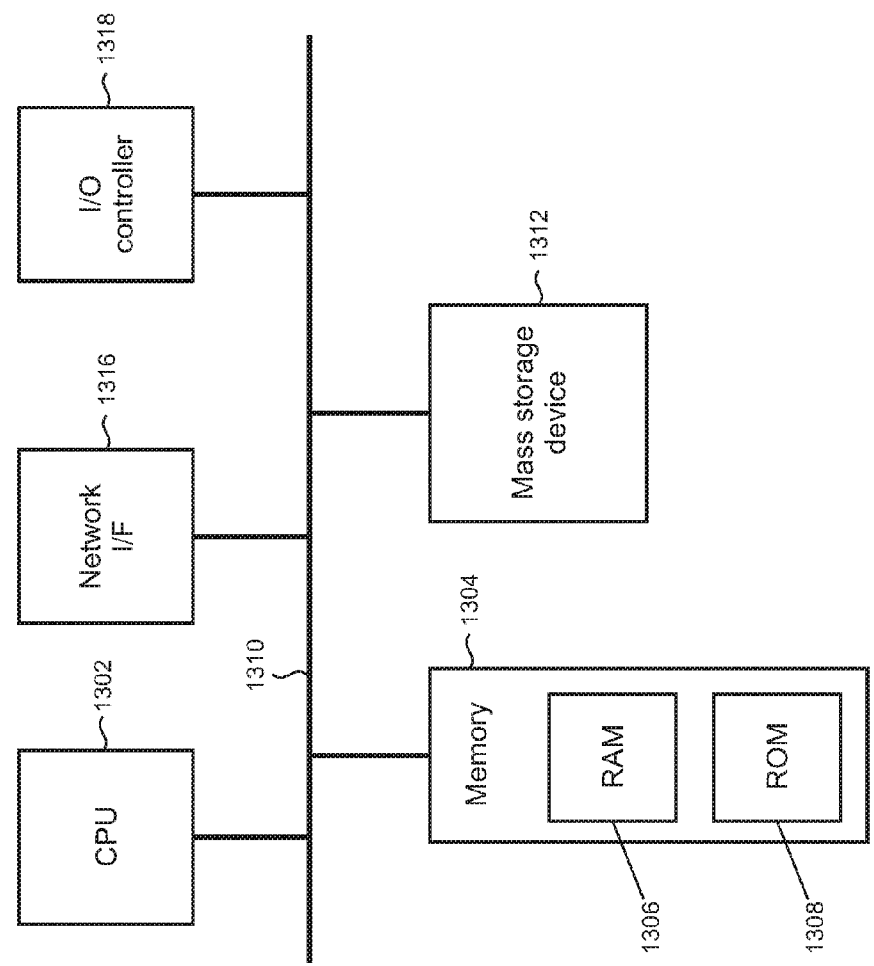
FIG. 13 shows a block diagram of an illustrative device that may be used in part to implement the present fault-tolerant variable region repaving during an FOTA update.

FIG. 13 shows an illustrative architecture 1300 for a device capable of executing the various components described herein for providing the present fault-tolerant variable region repaving during an FOTA update. Thus, the architecture 1300 illustrated in FIG. 13 shows an architecture that may be adapted for a server computer, mobile phone, a PDA, a smartphone, desktop computer, netbook computer, tablet computer, GPS device, gaming console, laptop computer, and the like. The architecture 1300 may be utilized to execute any aspect of the components presented herein.

The architecture 1300 illustrated in FIG. 13 includes a CPU (Central Processing Unit) 1302, a system memory 1304, including a RAM 1306 and a ROM 1308, and a system bus 1310 that couples the memory 1304 to the CPU 1302. A basic input/output system containing the basic routines that help to transfer information between elements within the architecture 1300, such as during startup, is stored in the ROM 1308. The architecture 1300 further includes a mass storage device 1312 for storing software code or other computer-executed code that is utilized to implement applications, the file system, and the operating system.

The mass storage device 1312 is connected to the CPU 1302 through a mass storage controller (not shown) connected to the bus 1310. The mass storage device 1312 and its associated computer-readable storage media provide non-volatile storage for the architecture 1300.

Although the description of computer-readable storage media contained herein refers to a mass storage device, such as a hard disk or CD-ROM drive, it should be appreciated by those skilled in the art that computer-readable storage media can be any available storage media that can be accessed by the architecture 1300.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1300.

According to various embodiments, the architecture 1300 may operate in a networked environment using logical connections to remote computers through a network. The architecture 1300 may connect to the network through a network interface unit 1316 connected to the bus 1310. It should be appreciated that the network interface unit 1316 also may be utilized to connect to other types of networks and remote computer systems. The architecture 1300 also may include an input/output controller 1318 for receiving and processing input from a number of other devices, including a keyboard, mouse, or electronic stylus (not shown in FIG. 13). Similarly, the input/output controller 1318 may provide output to a display screen, a printer, or other type of output device (also not shown in FIG. 13).

It should be appreciated that the software components described herein may, when loaded into the CPU 1302 and executed, transform the CPU 1302 and the overall architecture 1300 from a general-purpose computing system into a special-purpose computing system customized to facilitate the functionality presented herein. The CPU 1302 may be constructed from any number of transistors or other discrete circuit elements, which may individually or collectively assume any number of states. More specifically, the CPU 1302 may operate as a finite-state machine, in response to executable instructions contained within the software modules disclosed herein. These computer-executable instructions may transform the CPU 1302 by specifying how the CPU 1302 transitions between states, thereby transforming the transistors or other discrete hardware elements constituting the CPU 1302.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 1300 in order to store and execute the software components presented herein. It also should be appreciated that the architecture 1300 may include other types of computing devices, including handheld computers, embedded computer systems, smartphones, PDAs, and other types of computing devices known to those skilled in the art. It is also contemplated that the architecture 1300 may not include all of the components shown in FIG. 13, may include other components that are not explicitly shown in FIG. 13, or may utilize an architecture completely different from that shown in FIG. 13.

Figure 14:
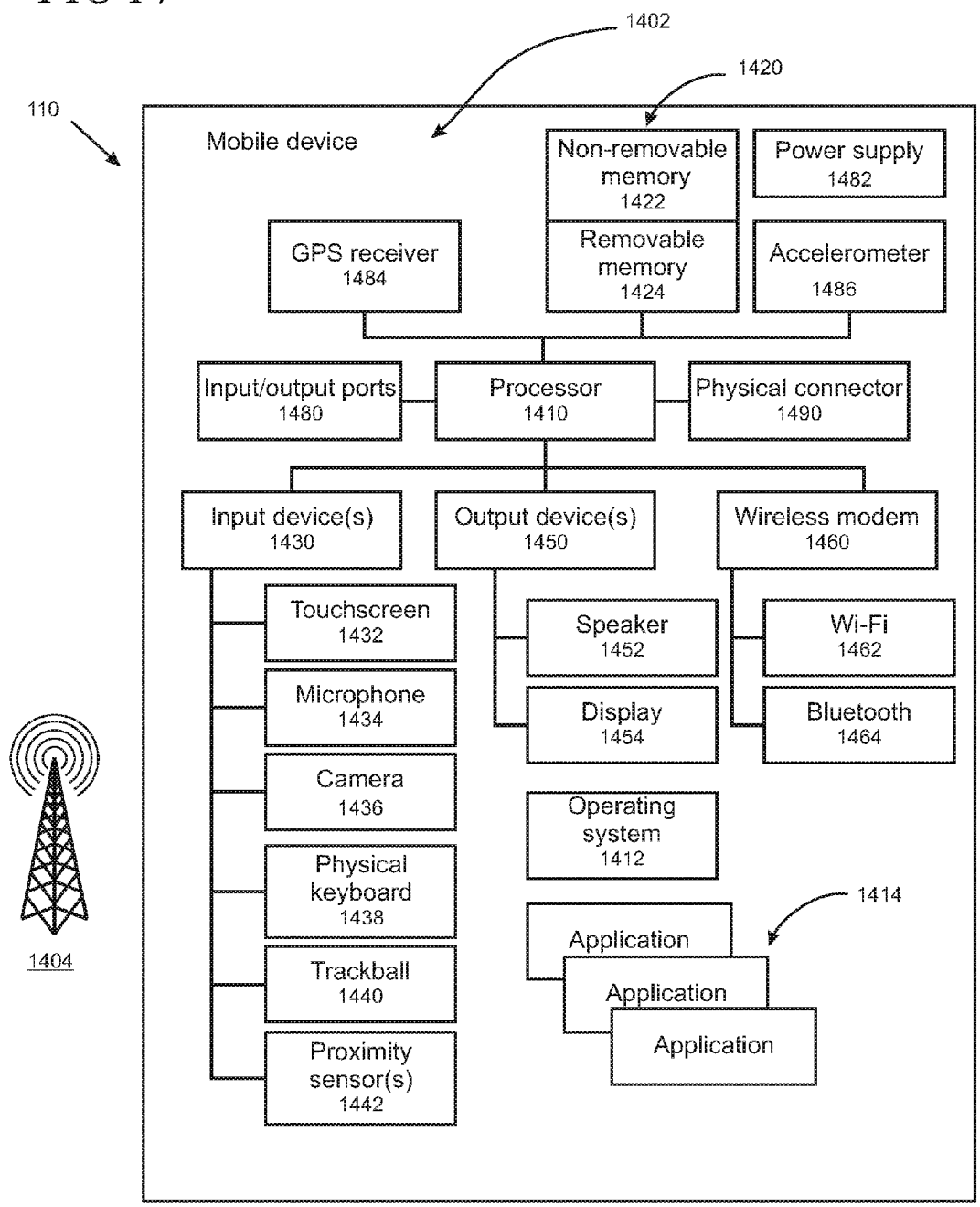
FIG. 14 is a block diagram of an illustrative device such as a mobile phone or smartphone.

FIG. 14 is a functional block diagram of an illustrative device 110 such as a mobile phone or smartphone including a variety of optional hardware and software components, shown generally at 1402. Any component 1402 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 1404, such as a cellular or satellite network.

The illustrated device 110 can include a controller or processor 1410 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 1412 can control the allocation and usage of the components 1402, including power states, above-lock states, and below-lock states, and provides support for one or more application programs 1414. The application programs can include common mobile computing applications (e.g., image-capture applications, email applications, calendars, contact managers, web browsers, messaging applications), or any other computing application.

The illustrated device 110 can include memory 1420. Memory 1420 can include non-removable memory 1422 and/or removable memory 1424. The non-removable memory 1422 can include RAM, ROM, Flash memory, a hard disk, or other well-known memory storage technologies. The removable memory 1424 can include Flash memory or a Subscriber Identity Module (SIM) card, which is well known in GSM (Global System for Mobile communications) systems, or other well-known memory storage technologies, such as "smart cards." The memory 1420 can be used for storing data and/or code for running the operating system 1412 and the application programs 1414. Example data can include web pages, text, images, sound files, video data, or other data sets to be sent to and/or received from one or more network servers or other devices via one or more wired or wireless networks.

The memory 1420 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 110.

The memory 1420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 110 can support one or more input devices 1430; such as a touchscreen 1432; microphone 1434 for implementation of voice input for voice recognition, voice commands and the like; camera 1436; physical keyboard 1438; trackball 1440; and/or proximity sensor 1442; and one or more output devices 1450, such as a speaker 1452 and one or more displays 1454. Other input devices (not shown) using gesture recognition may also be utilized in some cases. Other possible output devices (not shown) can include piezoelectric or haptic output devices. Some devices can serve more than one input/output function. For example, touchscreen 1432 and display 1454 can be combined into a single input/output device.

A wireless modem 1460 can be coupled to an antenna (not shown) and can support two-way communications between the processor 1410 and external devices, as is well understood in the art. The modem 1460 is shown generically and can include a cellular modem for communicating with the mobile communication network 1404 and/or other radio-based modems (e.g., Bluetooth 1464 or Wi-Fi 1462). The wireless modem 1460 is typically configured for communication with one or more cellular networks, such as a GSM network for data and voice communications within a single cellular network, between cellular networks, or between the device and a public switched telephone network (PSTN).

The device can further include at least one input/output port 1480, a power supply 1482, a satellite navigation system receiver 1484, such as a GPS receiver, an accelerometer 1486, a gyroscope (not shown), and/or a physical connector 1490, which can be a USB port, IEEE 1394 (FireWire) port, and/or an RS-232 port. The illustrated components 1402 are not required or all-inclusive, as any components can be deleted and other components can be added.

Figure 15:
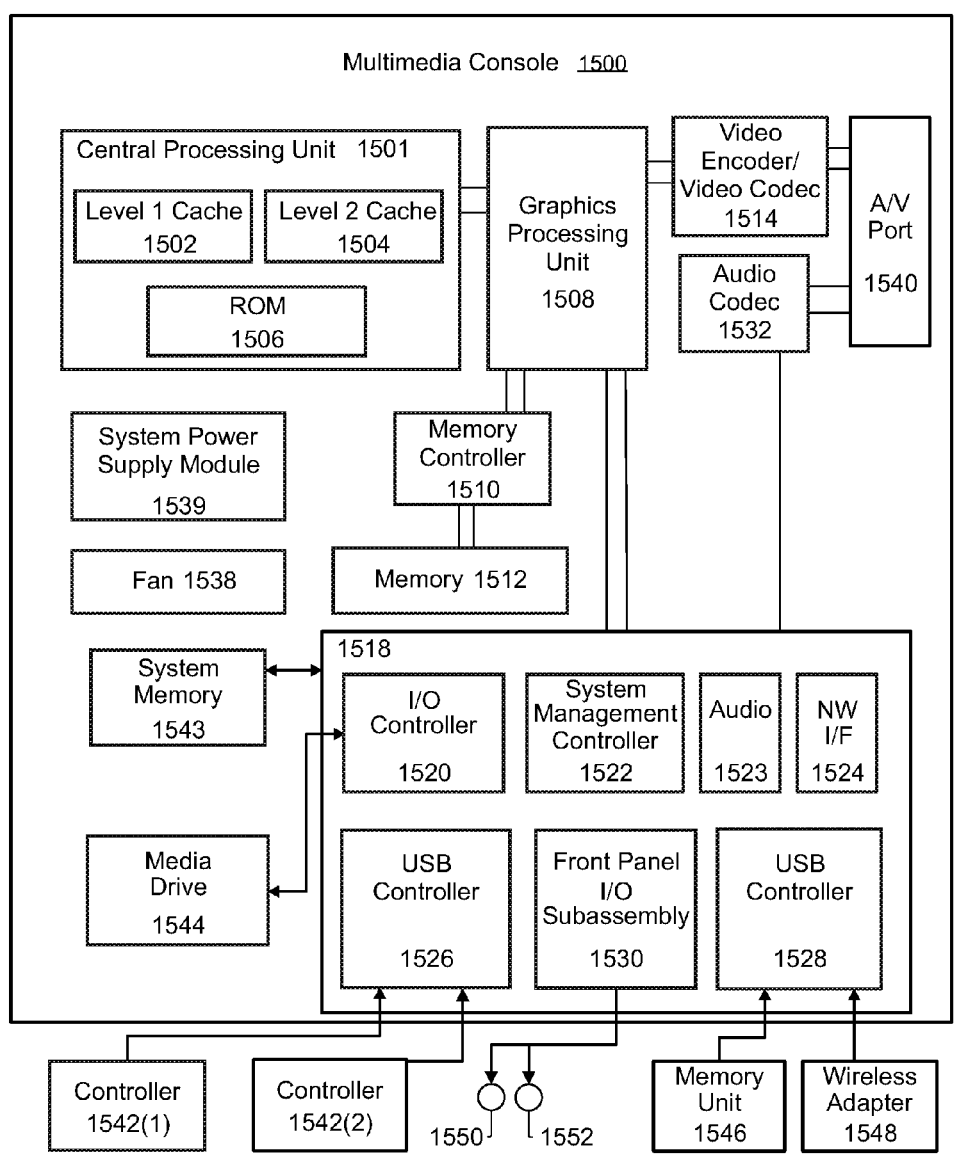
FIG. 15 is a block diagram of an illustrative multimedia console.

FIG. 15 is an illustrative functional block diagram of a multimedia console 1500. The multimedia console 1500 has a central processing unit (CPU) 1501 having a level 1 cache 1502, a level 2 cache 1504, and a Flash ROM (Read Only Memory) 1506. The level 1 cache 1502 and the level 2 cache 1504 temporarily store data and hence reduce the number of memory access cycles, thereby improving processing speed and throughput. The CPU 1501 may be configured with more than one core, and thus, additional level 1 and level 2 caches 1502 and 1504. The Flash ROM 1506 may store executable code that is loaded during an initial phase of a boot process when the multimedia console 1500 is powered ON.

A graphics processing unit (GPU) 1508 and a video encoder/video codec (coder/decoder) 1514 form a video processing pipeline for high speed and high resolution graphics processing. Data is carried from the GPU 1508 to the video encoder/video codec 1514 via a bus. The video processing pipeline outputs data to an A/V (audio/video) port 1540 for transmission to a television or other display. A memory controller 1510 is connected to the GPU 1508 to facilitate processor access to various types of memory 1512, such as, but not limited to, a RAM.

The multimedia console 1500 includes an I/O controller 1520, a system management controller 1522, an audio processing unit 1523, a network interface controller 1524, a first USB (Universal Serial Bus) host controller 1526, a second USB controller 1528, and a front panel I/O subassembly 1530 that are preferably implemented on a module 1518. The USB controllers 1526 and 1528 serve as hosts for peripheral controllers 1542(1) and 1542(2), a wireless adapter 1548, and an external memory device 1546 (e.g., Flash memory, external CD/DVD ROM drive, removable media, etc.). The network interface controller 1524 and/or wireless adapter 1548 provide access to a network (e.g., the Internet, home network, etc.) and may be any of a wide variety of various wired or wireless adapter components including an Ethernet card, a modem, a Bluetooth module, a cable modem, or the like.

System memory 1543 is provided to store application data that is loaded during the boot process. A media drive 1544 is provided and may comprise a DVD/CD drive, hard drive, or other removable media drive, etc. The media drive 1544 may be internal or external to the multimedia console 1500. Application data may be accessed via the media drive 1544 for execution, playback, etc. by the multimedia console 1500. The media drive 1544 is connected to the I/O controller 1520 via a bus, such as a Serial ATA bus or other high speed connection (e.g., IEEE 1394).

The system management controller 1522 provides a variety of service functions related to assuring availability of the multimedia console 1500. The audio processing unit 1523 and an audio codec 1532 form a corresponding audio processing pipeline with high fidelity and stereo processing. Audio data is carried between the audio processing unit 1523 and the audio codec 1532 via a communication link. The audio processing pipeline outputs data to the A/V port 1540 for reproduction by an external audio player or device having audio capabilities.

The front panel I/O subassembly 1530 supports the functionality of the power button 1550 and the eject button 1552, as well as any LEDs (light emitting diodes) or other indicators exposed on the outer surface of the multimedia console 1500. A system power supply module 1539 provides power to the components of the multimedia console 1500. A fan 1538 cools the circuitry within the multimedia console 1500.

The CPU 1501, GPU 1508, memory controller 1510, and various other components within the multimedia console 1500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 1500 is powered ON, application data may be loaded from the system memory 1543 into memory 1512 and/or caches 1502 and 1504 and executed on the CPU 1501. The application may present a graphical user interface that provides a consistent user experience when navigating to different media types available on the multimedia console 1500. In operation, applications and/or other media contained within the media drive 1544 may be launched or played from the media drive 1544 to provide additional functionalities to the multimedia console 1500.

The multimedia console 1500 may be operated as a standalone system by simply connecting the system to a television or other display. In this standalone mode, the multimedia console 1500 allows one or more users to interact with the system, watch movies, or listen to music. However, with the integration of broadband connectivity made available through the network interface controller 1524 or the wireless adapter 1548, the multimedia console 1500 may further be operated as a participant in a larger network community.

When the multimedia console 1500 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console 1500 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 1501 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 1542(1) and 1542(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Figure 16:
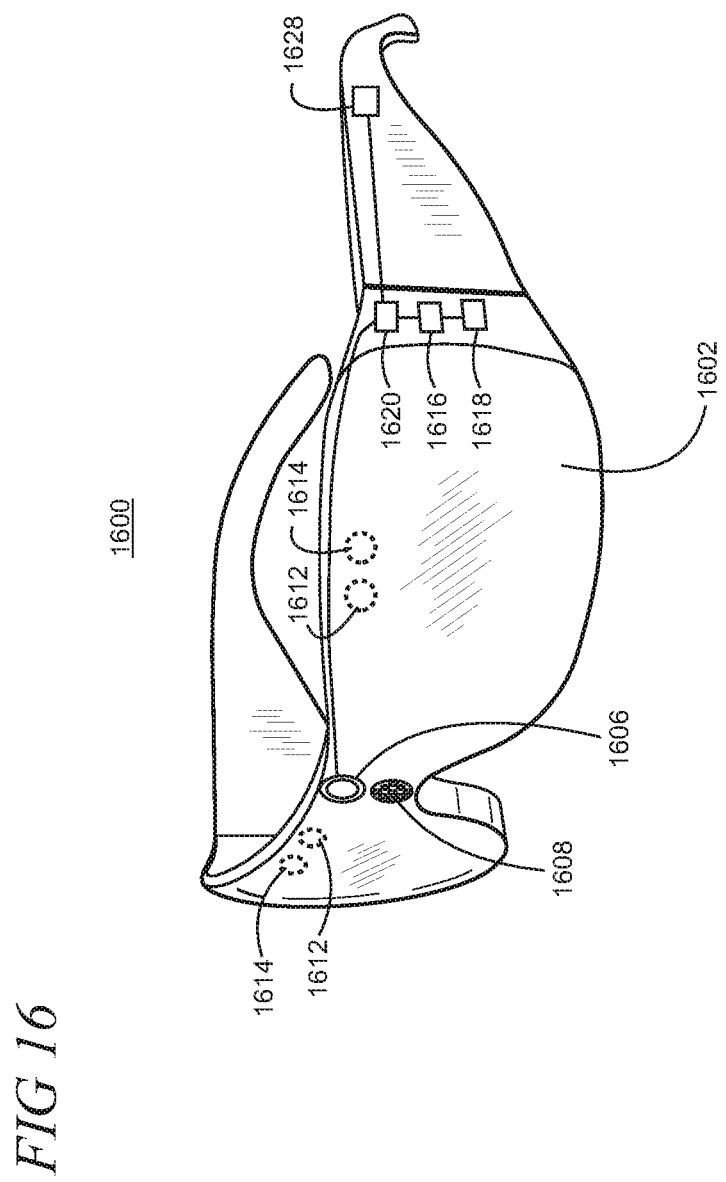
FIG. 16 is a pictorial view of an illustrative example of a virtual reality or mixed reality head-mounted display (HMD) device.
Figure 17:
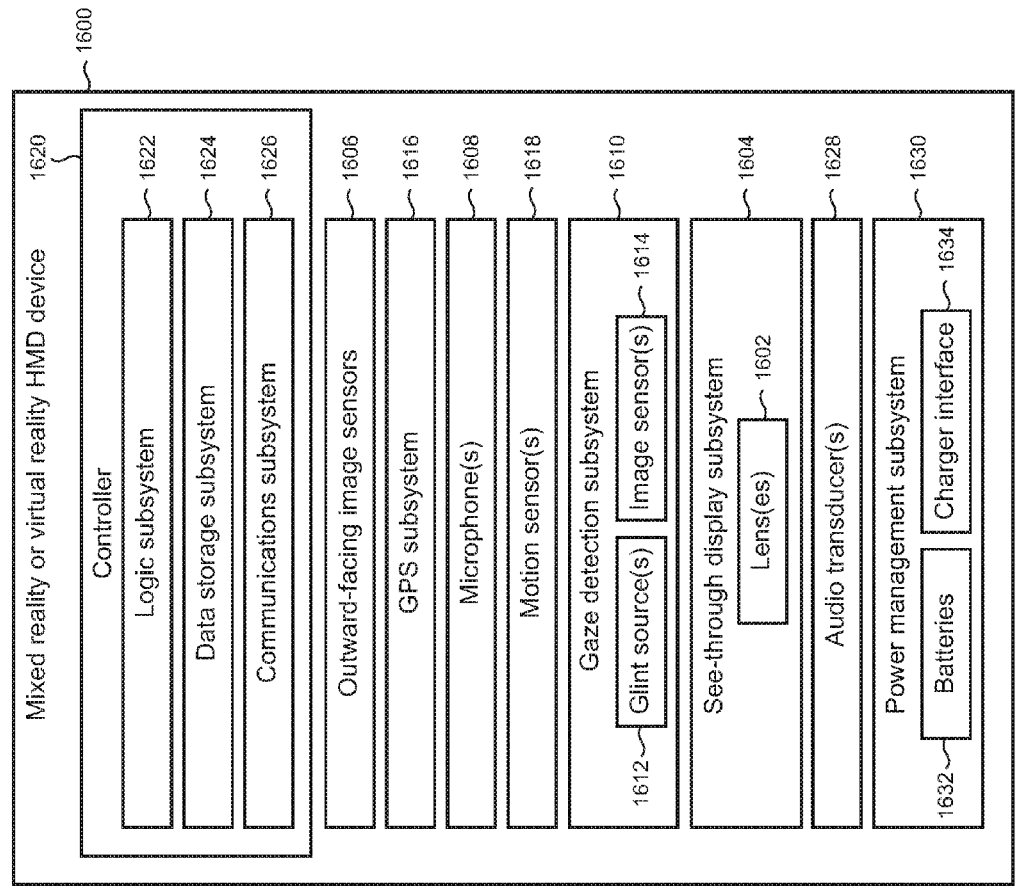
FIG. 17 shows a block diagram of an illustrative example of a virtual reality or mixed reality HMD device.

FIG. 16 shows one particular illustrative example of a see-through, mixed reality or virtual reality HMD device 1600, and FIG. 17 shows a functional block diagram of the device 1600. HMD device 1600 comprises one or more lenses 1602 that form a part of a see-through display subsystem 1604, so that images may be displayed using lenses 1602 (e.g. using projection onto lenses 1602, one or more waveguide systems, such as a near-eye display system, incorporated into the lenses 1602, and/or in any other suitable manner). HMD device 1600 further comprises one or more outward-facing image sensors 1606 configured to acquire images of a background scene and/or physical environment being viewed by a user, and may include one or more microphones 1608 configured to detect sounds, such as voice commands from a user. Outward-facing image sensors 1606 may include one or more depth sensors and/or one or more two-dimensional image sensors. In alternative arrangements, as noted above, a mixed reality or virtual reality display system, instead of incorporating a see-through display subsystem, may display mixed reality or virtual reality images through a viewfinder mode for an outward-facing image sensor.

The HMD device 1600 may further include a gaze detection subsystem 1610 configured for detecting a direction of gaze of each eye of a user or a direction or location of focus, as described above. Gaze detection subsystem 1610 may be configured to determine gaze directions of each of a user's eyes in any suitable manner. For example, in the illustrative example shown, a gaze detection subsystem 1610 includes one or more glint sources 1612, such as infrared light sources, that are configured to cause a glint of light to reflect from each eyeball of a user, and one or more image sensors 1614, such as inward-facing sensors, that are configured to capture an image of each eyeball of the user. Changes in the glints from the user's eyeballs and/or a location of a user's pupil, as determined from image data gathered using the image sensor(s) 1614, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 1610 may have any suitable number and arrangement of light sources and image sensors. In some implementations, the gaze detection subsystem 1610 may be omitted.

The HMD device 1600 may also include additional sensors. For example, HMD device 1600 may comprise a global positioning system (GPS) subsystem 1616 to allow a location of the HMD device 1600 to be determined. This may help to identify real-world objects, such as buildings, etc. that may be located in the user's adjoining physical environment.

The HMD device 1600 may further include one or more motion sensors 1618 (e.g., inertial, multi-axis gyroscopic, or acceleration sensors) to detect movement and position/orientation/pose of a user's head when the user is wearing the system as part of a mixed reality or virtual reality HMD device. Motion data may be used, potentially along with eye-tracking glint data and outward-facing image data, for gaze detection, as well as for image stabilization to help correct for blur in images from the outward-facing image sensor(s) 1606. The use of motion data may allow changes in gaze location to be tracked even if image data from outward-facing image sensor(s) 1606 cannot be resolved.

In addition, motion sensors 1618, as well as microphone(s) 1608 and gaze detection subsystem 1610, also may be employed as user input devices, such that a user may interact with the HMD device 1600 via gestures of the eye, neck and/or head, as well as via verbal commands in some cases. It may be understood that sensors illustrated in FIGS. 16 and 17 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 1600 can further include a controller 1620 such as one or more processors having a logic subsystem 1622 and a data storage subsystem 1624 in communication with the sensors, gaze detection subsystem 1610, display subsystem 1604, and/or other components through a communications subsystem 1626. The communications subsystem 1626 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1624 may include instructions stored thereon that are executable by logic subsystem 1622, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 1600 is configured with one or more audio transducers 1628 (e.g., speakers, earphones, etc.) so that audio can be utilized as part of a mixed reality or virtual reality experience. A power management subsystem 1630 may include one or more batteries 1632 and/or protection circuit modules (PCMs) and an associated charger interface 1634 and/or remote power interface for supplying power to components in the HMD device 1600.

It may be appreciated that the HMD device 1600 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Various exemplary embodiments of the present fault-tolerant variable region repaving during firmware over the air update are now presented by way of illustration and not as an exhaustive list of all embodiments. An example includes a method for updating firmware on a device, comprising: receiving a firmware update payload at the device; exposing a secure non-volatile memory store on the device, the memory store comprising a primary region and a spare region, each of the primary region and spare region including a working store configured to store transaction records and a variable store configured to store variable records; setting one or more switches for selectively enabling or disabling writing of the variable records during a firmware over the air (FOTA) update; responsively to the one or more switches being set for write enablement i) using the spare region to create a back-up of variable records contained in the primary region, ii) copying variable records from the firmware update payload, and iii) writing the copied variable records into the primary region.

In another example, the back-up creation comprises: copying variable records in the primary region and writing the variable records to the spare region; erasing content in the working store within the primary region; erasing variable records in the primary region; copying variable records from a firmware update payload received at the device; and erasing variable records in the spare region after writing the copied variable records into the primary region. In another example, the method further includes, if a fault occurs during the erasing of content in the working store, then copying variable records from the spare region, writing the copied variable records from the spare region into the primary region, and restarting the firmware updating process after a subsequent device boot. In another example, the method further includes, if a fault occurs during the erasing of the variable records in the primary region, then aborting the firmware updating process, and restarting the firmware updating process after a subsequent device boot. In another example, the method further includes, if a fault occurs during the copying of the variable records from the firmware update payload or during the writing of the copied variable records to the primary region, then aborting the firmware updating process, and restarting the firmware updating process after a subsequent device boot. In another example, the method further includes, if a fault occurs subsequent to the copying of the variable records from the firmware update payload or subsequent to the writing of the copied variable records to the primary region, then initializing the working store in the primary region and resuming normal device operations. In another example, the method further includes, if a fault occurs during the erasing of the variable records in the spare region, then initializing the working store in the primary region and resuming normal device operations. In another example, a switch comprises a version of currently installed firmware on the device that is compared to a version of firmware in the update payload, and wherein the variable writing in the FOTA update process is enabled if the installed firmware version is older than the update firmware version. In another example, a switch comprises a firmware variable having on and off states to indicate when the variable repaving is respectively enabled or disabled in an FOTA update process. In another example, the writing is performed using a fault-tolerant process.

A further example includes a device, comprising: one or more processors; a network interface; and one or more hardware-based memory devices storing computer-readable instructions which, when executed by the one or more processors, cause the device to: receive, over the network interface, a firmware update payload of firmware variables as part of a firmware over the air (FOTA) update process, attempt to validate the firmware update payload using a runtime cryptographic process, if the firmware update payload is validated, use a secure spare region of a non-volatile memory device to create a back-up of firmware variables contained in a secure primary region of the non-volatile memory device, and write the firmware variables from the payload into the primary region, and if the firmware update payload is not validated, then abort the FOTA update process.

In another example, the instructions, when executed by the one or more processors, cause the device to: use the back-up of the firmware variables to set the device to a known good boot state if a fault occurs in the FOTA update process, and erase the back-up if the firmware variables from the payload are successfully written to the primary region. In another example, the validating is performed using a cryptographic process. In another example, the validating comprises matching a runtime-calculated hash of variable records with a hash of variable records contained in a firmware update payload received from a remote source. In another example, the hash of variable records contained in the firmware update payload is stored in a secure boot manifest in the firmware update payload.

A further example includes one or more hardware-based computer-readable memory devices storing computer-executable instructions which, when executed by one or more processors disposed in a computing device, cause the device to: receive a firmware update payload in a firmware over the air (FOTA) update wherein the firmware update payload includes a whitelist of variable records, the whitelist of variable records specifying one or more device states; extract variable records from the firmware update payload; use the extracted variable records to repave a primary region of a secure non-volatile memory store on the device; and persist the one or more device states in accordance with the whitelist of variable records after the FOTA update is completed.

In another example, the variable records represent UEFI (Unified Extensible Firmware Interface) variables. In another example, the memory store is one of SPI (serial peripheral interface), Flash memory, or eMMC (embedded multimedia card) memory. In another example, the repaving uses a fault-tolerant writing (FTW) protocol using transaction records as specified by TianoCore.org. In another example, the repaving is a last step performed in a firmware over the air update.

Based on the foregoing, it should be appreciated that technologies for fault-tolerant variable region repaving during an FOTA update have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A method for updating firmware on a device, comprising:
receiving a firmware update payload at the device;
exposing a secure non-volatile memory store on the device, the memory store comprising a primary region and a spare region, each of the primary region and spare region including a working store configured to store transaction records and a variable store configured to store variable records;
setting one or more switches for selectively enabling or disabling writing of the variable records during a firmware over the air (FOTA) update;
responsively to the one or more switches being set for write enablement, using the spare region to create a back-up of variable records contained in the primary region, copying variable records from the firmware update payload, and writing the copied variable records into the primary region.

2. The method of claim 1 in which the back-up creation comprises:
copying variable records in the primary region and writing the variable records to the spare region;
erasing content in the working store within the primary region;
erasing variable records in the primary region;
copying variable records from a firmware update payload received at the device; and
erasing variable records in the spare region after writing the copied variable records into the primary region.

3. The method of claim 2 further including, if a fault occurs during the erasing of content in the working store, then copying variable records from the spare region, writing the copied variable records from the spare region into the primary region, and restarting the firmware updating method after a subsequent device boot.

4. The method of claim 2 further including, if a fault occurs during the erasing of the variable records in the primary region, then aborting the firmware updating process, and restarting the firmware updating process after a subsequent device boot.

5. The method of claim 2 further including, if a fault occurs during the copying of the variable records from the firmware update payload or during the writing of the copied variable records to the primary region, then aborting the firmware updating process, and restarting the firmware updating process after a subsequent device boot.

6. The method of claim 2 further including, if a fault occurs subsequent to the copying of the variable records from the firmware update payload or subsequent to the writing of the copied variable records to the primary region, then initializing the working store in the primary region and resuming normal device operations.

7. The method of claim 2 further including, if a fault occurs during the erasing of the variable records in the spare region, then initializing the working store in the primary region and resuming normal device operations.

8. The method of claim 1 in which a switch comprises a version of currently installed firmware on the device that is compared to a version of firmware in the update payload, and wherein the variable writing in the FOTA update is enabled if the installed firmware version is older than the update firmware version.

9. The device of claim 1 in which a switch comprises a firmware variable having on and off states to indicate when the variable repaving is respectively enabled or disabled in an FOTA update.

10. The method of claim 1 in which the writing is performed using a fault-tolerant process.

11. A device, comprising:
one or more processors;
a network interface; and
one or more hardware-based memory devices storing computer-readable instructions which, when executed by the one or more processors, cause the device to:
receive, over the network interface, a firmware update payload of firmware variables as part of a firmware over the air (FOTA) update process,
attempt to validate the firmware update payload using a runtime cryptographic process,
if the firmware update payload is validated, use a secure spare region of a non-volatile memory device to create a back-up of firmware variables contained in a secure primary region of the non-volatile memory device, and write the firmware variables from the payload into the primary region, and
if the firmware update payload is not validated, then abort the FOTA update process.

12. The device of claim 11 wherein the instructions, when executed by the one or more processors, cause the device to:
use the back-up of the firmware variables to set the device to a known good boot state if a fault occurs in the FOTA update process, and
erase the back-up if the firmware variables from the payload are successfully written to the primary region.

13. The device of claim 11 in which the validating is performed using a cryptographic process.

14. The device of claim 11 in which the validating comprises matching a runtime-calculated hash of variable records with a hash of variable records contained in a firmware update payload received from a remote source.

15. The device of claim 14 in which the hash of variable records contained in the firmware update payload is stored in a secure boot manifest in the firmware update payload.

16. One or more hardware-based computer-readable memory devices storing computer-executable instructions which, when executed by one or more processors disposed in a computing device, cause the device to:
receive a firmware update payload in a firmware over the air (FOTA) update wherein the firmware update payload includes a whitelist of variable records, the whitelist of variable records specifying one or more device states;
extract variable records from the firmware update payload;
use the extracted variable records to repave a primary region of a secure non-volatile memory store on the device; and
persist the one or more device states in accordance with the whitelist of variable records after the FOTA update is completed.

17. The one or more hardware-based computer-readable memory devices of claim 16 in which the variable records represent UEFI (Unified Extensible Firmware Interface) variables.

18. The one or more hardware-based computer-readable memory devices of claim 16 in which the memory store is one of SPI (serial peripheral interface), Flash memory, or eMMC (embedded multimedia card) memory.

19. The one or more hardware-based computer-readable memory devices of claim 16 in which the repaving uses a fault-tolerant writing (FTW) protocol using transaction records as specified by TianoCore.org.

20. The one or more hardware-based computer-readable memory devices of claim 16 in which the repaving is a last step performed in a firmware over the air update.

* * * * *